US007359371B2

(12) United States Patent
Emley et al.

(10) Patent No.: US 7,359,371 B2
(45) Date of Patent: Apr. 15, 2008

(54) SYSTEM AND METHOD FOR MODULAR PREMISES COMMUNICATION AND NETWORKING

(75) Inventors: Matthew P. Emley, Plano, TX (US); Arthur D. Heald, Plano, TX (US)

(73) Assignee: Uniden America Corporation, Forth Worth, TX (US)

( * ) Notice: Subject to any disclaimer, the term of this patent is extended or adjusted under 35 U.S.C. 154(b) by 692 days.

(21) Appl. No.: 10/401,808

(22) Filed: Mar. 28, 2003

(65) Prior Publication Data

US 2003/0165229 A1    Sep. 4, 2003

Related U.S. Application Data

(63) Continuation-in-part of application No. 09/764,625, filed on Jan. 17, 2001.

(51) Int. Cl.
  *H04I 12/66* (2006.01)
(52) U.S. Cl. .................. 370/352; 370/466; 709/203
(58) Field of Classification Search ............... None
  See application file for complete search history.

(56) References Cited

U.S. PATENT DOCUMENTS

| 5,166,931 | A | * | 11/1992 | Riddle ..................... 370/401 |
| 5,737,194 | A | * | 4/1998 | Hopkins et al. ............ 361/800 |
| 7,075,918 | B1 | * | 7/2006 | Kung et al. ................ 370/352 |
| 2001/0030950 | A1 | * | 10/2001 | Chen et al. ................ 370/329 |
| 2003/0084277 | A1 | * | 5/2003 | Przywara et al. ............ 713/1 |
| 2004/0103327 | A1 | * | 5/2004 | Dake et al. ................ 713/300 |
| 2004/0114610 | A1 | * | 6/2004 | Featherston et al. ........ 370/401 |
| 2004/0117536 | A1 | * | 6/2004 | Franke et al. ............... 710/302 |

OTHER PUBLICATIONS

World Wide Web, http://www.webopedia.com/TERM/x/xDSL.html, "xDSL," printed on Sep. 30, 2002, 2 pages.
79S334J "IP Sharing" and Broadband Gateway Development Platform, Integrated Device Technology, May 21, 2002, 2 pages.
World Wide Web, http://www.netopia.com/en-us/corp/press/02_06_18.html, "Actebis and Netopia Sign Distribution Agreement for the French Market," printe on Aug. 22, 2002, 3 pages.
World Wide Web, http://www.proxim.com/support/all/netlinegateway/technotes/tn2001-08-06d.html, "Proxim Tech Note," printed on Aug. 22, 2002, 1 page.
World Wide Web, http://biz.yahoo.ocm/bw/020604/40127_2.html, "Viadux Broadband Gateways Connect Remote Employees to Shell Petroleum's Global Network," printed on Aug. 22, 2002, 3 pages.

(Continued)

*Primary Examiner*—Creighton Smith
(74) *Attorney, Agent, or Firm*—Munsch Hardt Kopf & Harr, P.C.

(57) ABSTRACT

A system includes a base unit, a plurality of connectors disposed in the base unit each operable to couple to a module, and each module operable to couple to at least one terminal unit. The system further includes a host processor residing in the base unit and coupled to a communications network, and a first high speed switch residing in the base unit having a plurality of ports coupled to the plurality of connectors and further coupled to the host processor.

13 Claims, 3 Drawing Sheets

OTHER PUBLICATIONS

World Wide Web, http://www.provantage.com/fc_prxh.htm, "Proxim Corporation—Hubs & Broadband Gateways", printed on Aug. 22, 2002, 2 pages.

World Wide Web, http://devices.internet.com/news/9912/991228homeportal.htm, "2Wire to Deliver Broadband Home Gateway," printed on Aug. 22, 2002, 1 page.

World Wide Web, http://www.wirelessdevnet.com/news/newsitem.phtml?newsitemid=4069&channel=voice, "WirelessDevNet Daily New," printed on Aug. 22, 2002, 3 pages.

World Wide Web, http://www.viadux.com/about.cfm, "Viadux", printed on Aug. 22, 2002, 2 pages.

World Wide Web, http://www.xilinx.com/esp/knowledge_center/events/hnif.htm, "Home Networking Industry Form," printed on Aug. 22, 2002, 3 pages.

Kevin Hager, "Residential Broadband Deployment," presented on or around Feb. 1, 2001 at the Home Networking Industry Forum, Santa Clara, California, 20 pages.

World Wide Web, http://www.uniden.com/broadband/products/premises.html, "The Evolo System Brings The Network to the Premises," printed on Aug. 22, 2002, 1 page.

World Wide Web, http://www.uniden.com/broadband/products/base_unit_body.html, "The Evolo ADSL Base Module," printed on Aug. 22, 2002, 1 page.

World Wide Web, http://www.uniden.com/broadband/products/wem_body.html, "Evolo .4 GHz Wireless Extension Module and Wireless Handsets," printed on Aug. 22, 2002, 1 Page.

World Wide Web, http://www.uniden.com/broadband/index_body3.html, "Uniden Acquires Broadband Gateways," printed on Aug. 22, 2002, 1 page.

World Wide Web, http://www.uniden.com/broadband/products/applications_body.html, "One Platform, Multiple Market Segments," printed on Mar. 22, 2002. 1 page.

World Wide Web, http://www.uniden.com/broadband/products/todays_network.html, "ATM Forum Loop Emulation Network," printed on Aug. 22, 2002, 1 page.

World Wide Web, http://www.uniden.com/broadband/news/news_body.html, "Broadband Gateways, Inc. Press Room Section. Articles and Announcements," printed on Sep. 26, 2002, 3 pages.

World Wide Web, http://www.uniden.com/broadband/news/ipg_faq.html, "Evoloo Intelligent Premises Gateway FAQ," printed on Aug. 22, 2002, 7 pages.

World Wide Web, http://www.cconvergence.com/article/TCM20010525S0003/, The Teleconnect Staff, "Highly Converged," printed on Sep. 26, 2002, 2 pages.

World Wide Web, http://www.tvinsite.com/multichannelnews/index.asp?layout=print_page&doc_id=&articl..., "Home Gateways Ride The Revolutionary Road," printed on Sep. 26, 2002, 4 pages.

World Wide Web, http://www.dfwtechbiz.com/displayarticledetail.asp?art_id=48018&cat_id=4, "Telecom Company's Patent is Welcome Mat for Home Automation Services," printed on Sep. 26, 2002, 3 pages.

World Wide Web, http://www.zhone.com/press/archives/20010530.html, "Broadband Gateways and Zhone Technologies Partner, Work Toward Open-Standards Based Interoperability," printed on Sep. 26, 2002, 2 pages.

World Wide Web, http://www.cconvergence.com/article/TCM 20010525S0003, "General Bandwidth and Broadband Gateways Demonstrate VoDSL at DSL Forum Interoperability Showcase," printed on Sep. 26, 2002, 2 pages.

World Wide Web, http://www.coppercom.com/pressfull.asp?sysid=114, "Broadband Gateways and CopperCom Announce Voice Over DS Interoperability," printed on Sep. 26, 2002, 2 pages.

World Wide Web, http://www.homepnaorg/, "HomePNA" printed on Sep. 30, 2002, 2 pages.

World Wide Web, http://www.howstuffworks.com/vdsl.htm, "How VDSL Works," printed on Sep. 30, 2002, 2 pages.

World Wide Web, http://www.webopedia.com/TERM/S/SDSL.html, "SDSL," printed on Sep. 30, 2002, 2 pages.

World Wide Web, http://www.webopedia.com/TERM/A/ADSL.html, "ADSL", printed on Sep. 30, 2002, 2 pages.

* cited by examiner

SYSTEM AND METHOD FOR MODULAR PREMISES COMMUNICATION AND NETWORKING

RELATED APPLICATIONS

This patent application is a continuation-in-part application of U.S. patent application Ser. No. 09/764,625, entitled SYSTEM AND METHOD FOR DISTRIBUTING NETWORK COMMUNICATION SIGNALS, filed on Jan. 17, 2001.

TECHNICAL FIELD OF THE INVENTION

The present invention relates generally to the field of network communications, and more particularly to a system and method for modular premises communication and networking.

BACKGROUND OF THE INVENTION

A broadband gateway or a broadband router is commonly known as a device that connects a local area network (LAN) to a broadband Internet connection, such as a T1 line, a digital subscriber loop (DSL) or a cable modem. A gateway provides connectivity and routing between the Internet and multiple client computers. Some gateways can also act as a standalone access point that connects into an Ethernet network. Such gateway devices enable wired and wireless devices to share a broadband connection and be networked together. The gateway routes traffic from the Internet to the appropriate wired or wireless clients on the local area network.

There are currently a large variety of networking technologies for residential and small business applications. For example, 802.11a, 802.11b, and 802.11g specifications have thus far been defined for wireless LAN. There are also home radio frequency (HomeRF), Bluetooth, Homecast Open Protocol (HOP), and Digital Enhanced Cordless Telecommunications (DECT) technologies being deployed. Furthermore, there is an ever increasingly diverse number of options for data security, virus detection, content filtering, and other functions that users may desire. It may be seen that a gateway device may become quickly out of date as soon as it is deployed.

SUMMARY OF THE INVENTION

It is desirable to provide a gateway or a premises communication and networking system that is characterized by flexibility in order to easily configure the system according to changing needs, technology updates, and diverse technologies. A modular system is the answer to provide the desired flexibility.

In accordance with an embodiment of the invention, a system includes a base unit, a plurality of connectors disposed in the base unit each operable to couple to a module, and each module operable to couple to at least one terminal unit. The system further includes a host processor residing in the base unit and coupled to a communications network, and a first high speed switch residing in the base unit having a plurality of ports coupled to the plurality of connectors and further coupled to the host processor.

In accordance with yet another embodiment of the present invention, a modular communication and networking system includes a base unit, a host processor residing in the base unit and coupled to a communications network, and a plurality of connectors disposed in the base unit each operable to couple to a module, and each module operable to couple to at least one terminal unit. The system further includes a first high speed switch residing in the base unit having a plurality of ports coupled to the plurality of connectors and further coupled to the host processor, the first high speed switch operable to route Ethernet or IP data packets between the at least one terminal unit and the communications network.

In accordance with another embodiment of the present invention, a modular gateway operable to couple a plurality of terminal units and a communications network includes a base unit operable to accept and couple to a plurality of modules each having a predetermined functionality and operable to couple to at least one terminal unit. The system also includes a host processor residing in the base unit and coupled to the communications network, and a first high speed switch residing in the base unit having a plurality of ports coupled to the plurality of connectors and further coupled to the host processor, the first high speed switch operable to route voice and data signals between the terminal units and the communications network.

In accordance with yet another embodiment of the present invention, a modular communication and networking system includes a computer-readable medium having encoded thereon a process to initialize one or more modules coupled to the system. The process includes determining whether there is at least one uninitialized module present in the system, reading a memory residing in the module and accessing data associated with the module in response to a module being presenting in the system, initializing the module in response to the accessed data, and repeating the above steps until there are no additional uninitialized modules present in the system.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

The preferred embodiment of the present invention and its advantages are best understood by referring to FIGS. 1 through 4 of the drawings, like numerals being used for like and corresponding parts of the various drawings.

Figure 1:
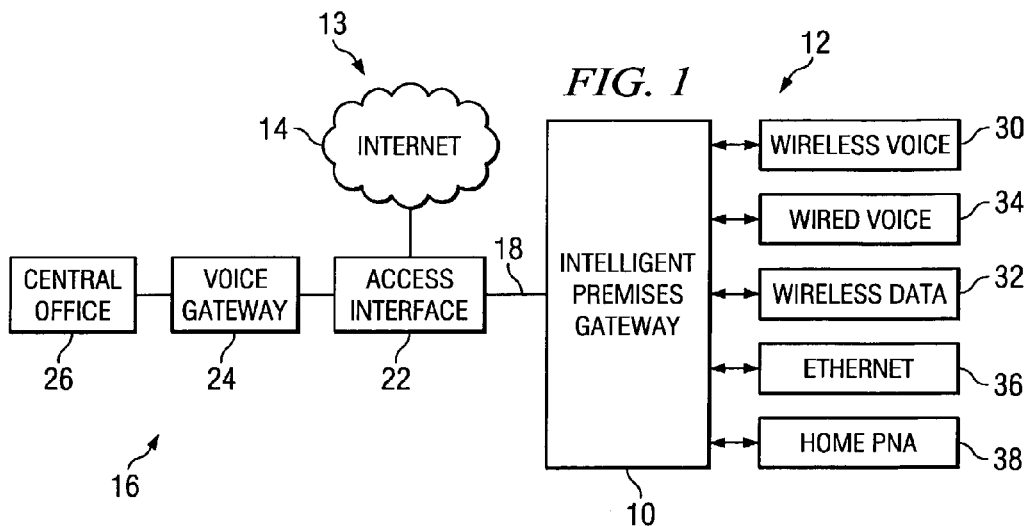
FIG. 1 is a simplified block diagram of an embodiment of a system of modular premises communication and networking according to the teachings of the present invention.

FIG. 1 is a simplified block diagram of an embodiment of a system of modular premises communication and networking 10 according to the teachings of the present invention. System 10 may also be referred to hereinafter as a modular intelligent premises gateway. System 10 serves as a point of connectivity for various types of premises equipment 12 to a communication network 13 via a communication link 18. Communication network 13 may include an access interface element 22 that provides access to the Internet, telecommunications network, broadband networks, and includes the ability to deliver intelligent voice, data and multimedia services. Access interface element 22 may be coupled to a voice gateway 24, which is in turn coupled to a central office 26. Access interface element 22 may include a cable modem, DSL modem, or other suitable devices.

Modular premises communication and networking system 10 is operable to couple and interface broadband services and telecommunication services to a plurality of customer premises equipment or terminal units 12. Customer premises equipment 12 may include wireless voice and data terminal units 30 and 32, respectively, wired voice terminal units 34, Ethernet or local area networked terminal units 36, Home Phoneline Network Alliance (HPNA) networked terminal units 38, and other suitable terminal units now known or later developed. System 10 is modular in construction so that its configuration is adaptable to the needs and requirements of a customer premises. For example, a particular customer premises may not have a home PNA network, so system 10 may be configured to exclude the home PNA module.

System 10 provides an interface between customer premises equipment 12 and communication network 13, and also provides high-level control and operation features and functionality to premises equipment terminal units. This reduces the hardware and/or software requirements of the premises terminal units and provides the advantages of greater flexibility, functionality and reduced cost.

Figure 2:
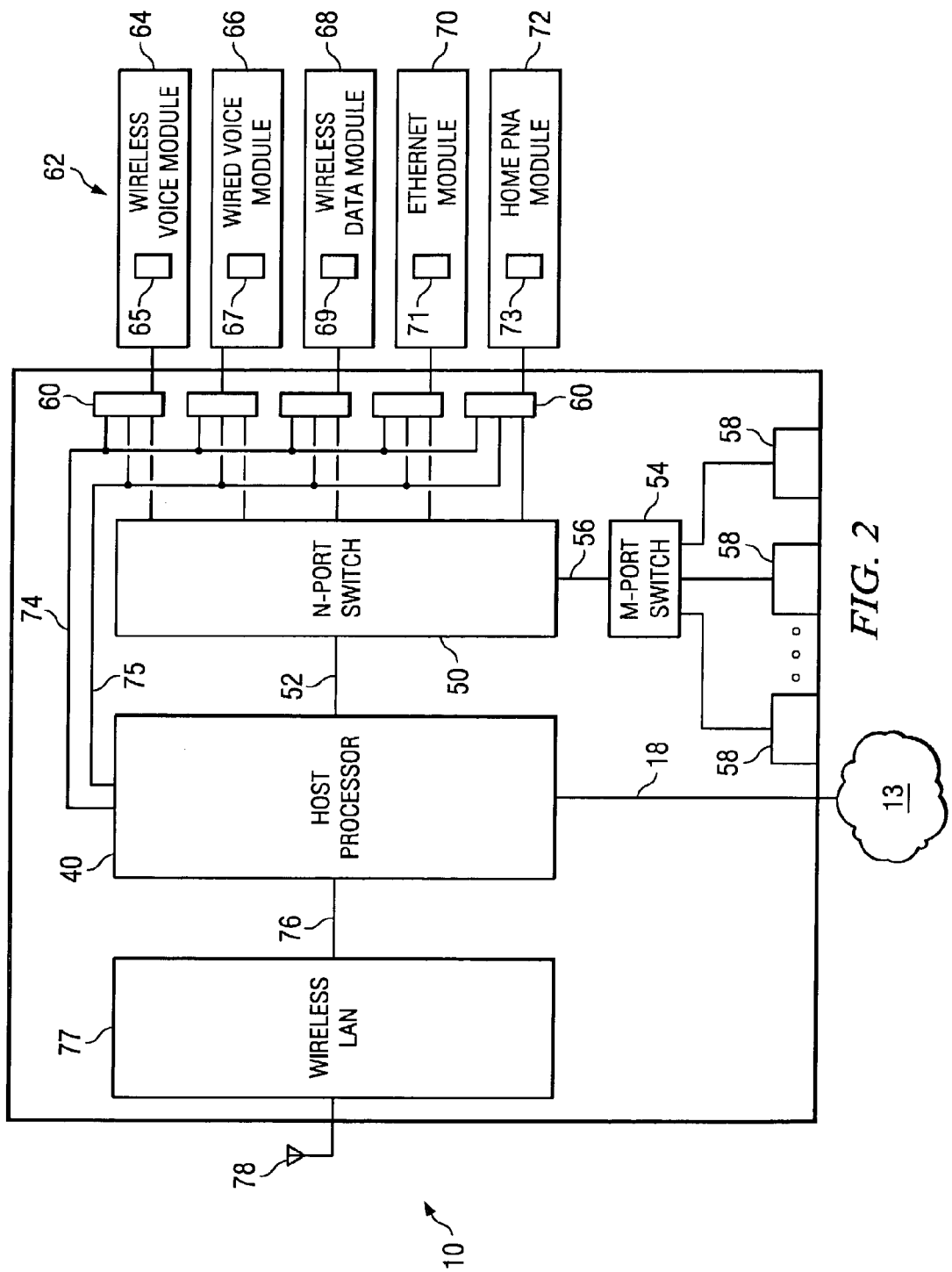
FIG. 2 is a more detailed block diagram of an embodiment of an embodiment of the system of modular premises communication and networking according to the teachings of the present invention.

FIG. 2 is a more detailed block diagram of an embodiment of system 10 according to the teachings of the present invention. System 10 includes a host processor 40, which is coupled to communication network 13 via one or more communication links such as a broadband communication link 18. Communication link 18 may be an asymmetric digital subscriber line (ADSL), VDSL (very high data rate DSL), HDSL (high data rate DSL), SDSL (symmetric DSL), xDSL (any type of DSL), or other suitable high speed data transmission technologies now known or later developed. Communication links 18 and 20 may use copper, optical, cable, wireless, satellite, or other suitable communication media.

Host processor 40 is coupled to an N-port switch 50 by a bus 52, such as a MII (Media Independent Interface) bus or a Gigabit MII bus, for example. MII is a standard bus that connects network interface controllers to physical media interfaces. N-port switch 50 has N ports, where N is a positive integer, and is preferably equipped with dual MII bus ports or interfaces, one of which is used to couple to host processor 40, and the other is used to couple to a M-port switch 54 via a second MII bus 56. M-port switch 54 has M ports, where M is a positive integer, and is preferably a high speed (10/100 base T) Ethernet switch with at least one MII port or interface. A certain number of ports of M-port switch 54 are coupled to respective modular data jacks 58 such as RJ-45 jacks. M may or may not be equal to N, depending on the desired system configuration.

The N ports of N-port switch 50 are coupled to a plurality of module connectors 60 that are operable to couple to a plurality of modules 62 that expand the functionality of system 10. For example, without modules 62, system 10 may provide a suite of basic communication and networking functions such as network address translation (NAT), firewall, data routing, and overall management of system operations using technologies now known or later developed. The plurality of modules 62 may, for example, include modules that provide the following functionality: data distribution functions including 802.11x (currently the Institute of Electrical and Electronics Engineers or IEEE has defined the 802.11a, 802.11b, and 802.11g specifications for wireless LAN), home radio frequency (HomeRF), Bluetooth, Homecast Open Protocol (HOP), and Digital Enhanced Cordless Telecommunications (DECT); security functions including virtual private network (VPN), computer virus detection and protection, and content filtration; voice functions including voice over asynchronous transfer mode (VoATM), voice over Internet Protocol (VoIP) for cable, and VoIP for POTS. These functionalities are provided herein to illustrate the type of diverse functionality that may be expanded to provide by using modules 62. Depending on need, cost, and other factors, a user may configure modular premises communication and networking system 10 by selecting and installing only those functional modules that satisfy those requirements. Therefore the functionality of system 10 may be expanded to include a wireless voice module 64, a wireline voice module 66, a wireless data module 68, an Ethernet module 70, and An HPNA module 72.

For ease of installation and reconfiguration, module connectors 60 are preferably peripheral component interconnect (PCI) expansion slots that securely couple to metal contacts located on the edge of a printed circuit board (PCB) in each module. Connectors 60 couple modules 62 to N-port switch 50. In addition to connecting to modules 62 via N-port switch 50, host processor 40 also has a separate data link 74 to each connector 60 that bypasses switch 50. Data link 74 is a serial link that serves as a general purpose input/output communication link with modules 62. For example, data link 74 may be used by host processor 40 to communicate with EEPROMs 65, 67, 69, 71, and 73 residing in respective modules 62. Host processor 40 may access data stored in the EEPROMs such as the type of module, an identifier of the module, and the version number of the software. Data link 74 may also carry voice or time division multiplex (TDM) data between host processor 40 and one or more appropriate modules 62. Host processor 40 may also use data link 74 to send commands to modules 62.

Host processor 40 may further comprise another communication link 75 that bypasses N-port switch 50 and couples to modules 62 via connectors 60. Communication link 75 may provide an asynchronous transfer mode (ATM) interface that supports the UTOPIA industry-standard bus architecture, for example. The aforementioned industry standards and formats are merely provided herein as examples and may be replaced with any other suitable substitutes. Host processor 40 may be further coupled to a local area network (LAN) via a wireless LAN Personal Computer Memory Card International Association (PCMCIA) card 77, for example.

Therefore, system 10 may serve as a broadband gateway and central hub at a customer premises for communication and networking purposes. System 10 may be equipped with an endless combination of functionalities that make it very flexible and adaptable to the needs of the customer. System 10 is also operable to interconnect a number of different types of data, voice, and multimedia terminal units 12 and enable them to be coupled to communications network 13. Terminal units may include desktop personal computers (PCs), laptops, notebook computers, personal digital assistants (PDAs), facsimile machines, digital senders, wired or wireless telephones, Internet-enabled gaming devices, and/or other devices. Each terminal unit may be Internet-enabled and may include a web browser for accessing the World Wide Web (WWW). Terminal units also have the ability to communicate with one another, and other terminal units and devices coupled to communication network 13. System 10 may make use of broadband access technologies including digital subscriber loop (DSL), cable broadcast plant, and fixed wireless local loop (WLL) technologies such as microwave multipoint distribution system (MMDS) and local multipoint distribution system (LMDS). Because system 10 is modular, it can be easily configured or reconfigured to suit a user's needs. Further, it can be easily updated with new modules when new and better technologies become available. N-port switch 50 and M-port switch 54 perform intelligent switching function to allow simultaneous calls of different technologies, such as a voice over IP (VoIP) call, an Internet IP session, a virtual private network (VPN), PPPoE (point-to-point protocol over Ethernet) session, and a PPPoA (point-to-point protocol over ATM) session, etc.

Figure 3:
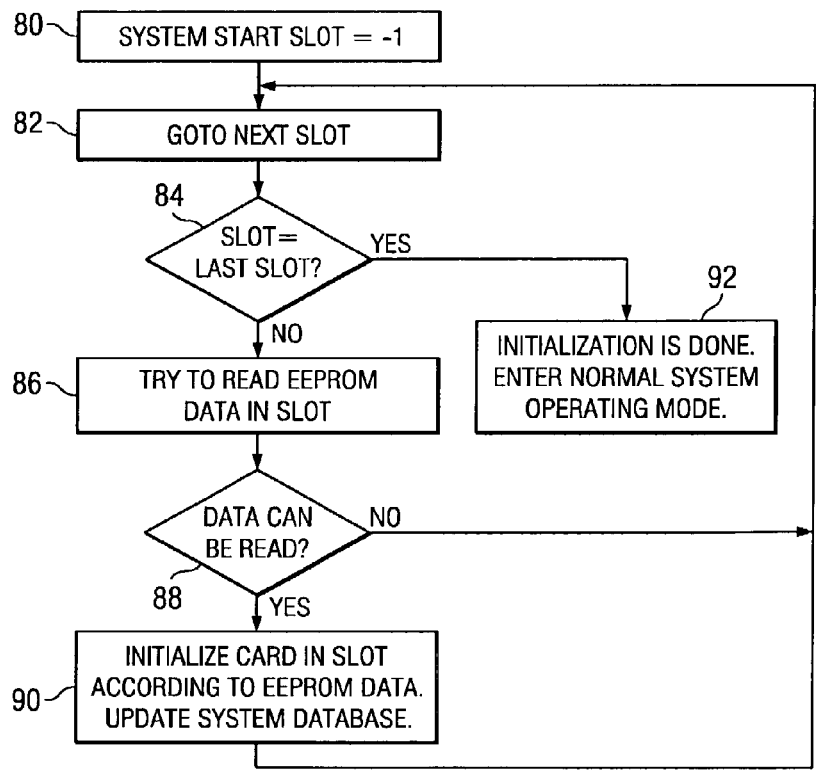
FIG. 3 is a simplified flowchart of an embodiment of the operations of the system of modular premises communication and networking according to the teachings of the present invention.

Referring to FIG. 3, an embodiment of a process for initializing system 10 is shown. In block 80 at system start up, a variable, slot, is first initialized as −1. In block 82, the slot variable is incremented to an index that references the next slot. The slot variable is checked to determine whether it is pointing to the last slot, as shown in block 84. If it is determined that the slot variable is not referencing the last slot, then the EEPROM data of the module residing in the slot is read, as shown in block 86. Data link 74 is used to relay the EEPROM data read from the module to host processor 40. If EEPROM data can be successfully read, as determined in block 88, then the module in the slot is initialized according to the EEPROM data that was read, and the system database (not shown) is updated to store data associated with the module that is in the slot, as shown in block 90. For example, host processor 40 may store the type of the module, the version number of the software that is executing in the module, and other associated data. Host processor 40 therefore knows how to communicate with the initialized module, its functions, and how to route data destined therefor. Initialization may be accomplished by issuing certain sequence of instructions to the module. Execution then proceeds to block 82, where the slot variable is incremented to reference the next slot. These steps are performed until all the modules in system 10 are initialized, and execution proceeds to block 92 where normal system operations begin.

Figure 4:
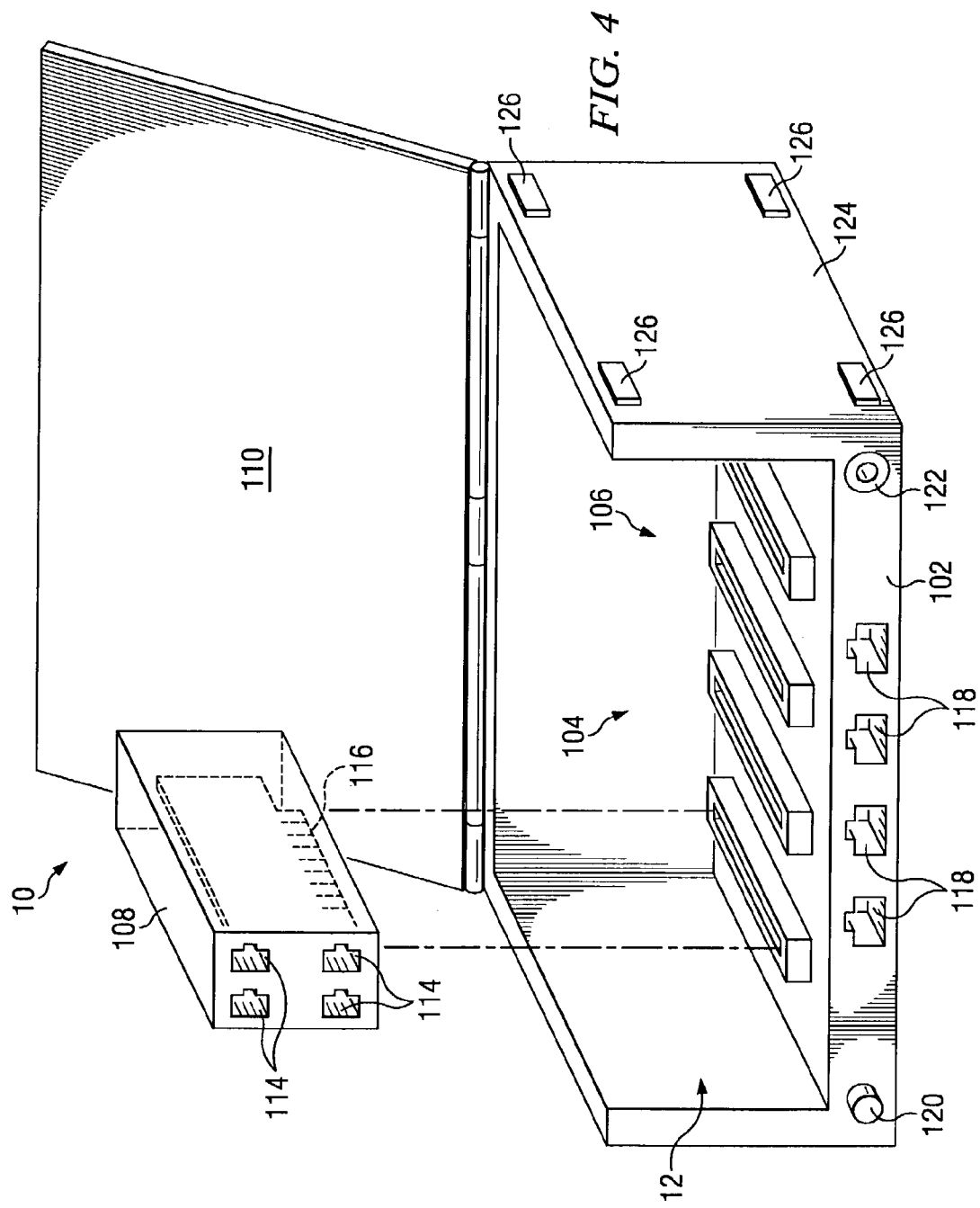
FIG. 4 is a perspective view of an embodiment of the system of modular premises communication and networking according to the teachings of the present invention.

FIG. 4 provides an elevational view of an embodiment of modular premises communication and networking system 10. System 10 comprises a base unit housing 102 that houses printed circuit boards with semiconductor devices and other circuit components, wiring, and other electrical or mechanical components of the base unit. Base unit housing 102 further forms a chamber 104 for housing a plurality of connectors 106 that are operable to receive and couple to modules 108. Base unit housing 102 further comprises a hinged lid 110 that is operable to open and enclose on at least one side of base unit housing 102 and protect modules 108 and connectors 106 in chamber 104. Preferably lid 110 did not enclose base unit housing 102 entirely and provided an opening 112 on a front side of base unit housing 102. Alternately, opening 112 may be covered by a transparent or opaque material, such as plastic or tempered glass. The material covering opening 112 may further be tinted. Module 108 may have a number of modular jacks 114 such as RJ-11 or RJ-45 jacks. Module 108 has a printed circuit board 116 with card edge connectors that couple with connectors 106 in base unit housing 102. Base unit housing 102 may further have additional data jacks 118 on a side of base unit housing 102. Additionally, a reset button 120 and a RWR jack 122 are provided on base unit housing 102. A bottom side 124 of base unit housing 102 preferably has a plurality of soft padded or rubber "feet" 126. It may be seen that base unit housing 102 is intended to stand with bottom side 124 down on a flat surface as so to occupy a smaller footprint.

Modular premises communication and networking system 10 accommodates, controls and routes data between communication network 13 and terminal units 12. Host processor 40 controls switches 50 and 54 to route data of various formats and protocols to the appropriate module and terminal unit. Because system 10 has a base unit that is operable to accept a number of modules that may have different functionality, it can be easily adapted to suit a particular user's networking requirements. System 10 can also be easily updated by replacing the modules when a particular networking technology is phased out or is no longer relevant. By using PCI connectors and the construction of system 10 as shown and described herein, a user does not need any tools to access the modules or to replace them. The modularity design also enables the replacement and updating of just a particular module providing a particular function to system 10 without disturbing other functionalities.

What is claimed is:

1. A system comprising:
   a base unit;
   a plurality of connectors disposed in the base unit each operable to couple to a module, and each module operable to couple to at least one terminal unit, wherein the plurality of connectors each comprises a peripheral component interconnect connector operable to couple to card edge contacts on a printed circuit board in the module;
   a host processor residing in the base unit and coupled to a communications network; and
   a first high speed switch residing in the base unit having a plurality of ports coupled to the plurality of connectors and further coupled to the host processor.

2. The system, as set forth in claim 1, further comprising a high speed bus coupling the first high speed switch to a second high speed switch residing in the base unit.

3. The system, as set forth in claim 1, wherein the first high speed switch is operable to route IP data between the at least one terminal unit coupled to the respective module and the communications network.

4. The system, as set forth in claim 1, wherein the first high speed switch is operable to route IP data between a plurality of terminal units coupled to a plurality of modules and between the plurality of terminal units and the communications network.

5. The system, as set forth in claim 1, wherein at least one module is selected from the group consisting of a local area network module, a wireless local area network module, a HomeRF module, a Bluetooth module, a Homecast Open Protocol module, a Digital Enhanced Cordless Telecommunications module, a virtual private network module, a computer security module, a voice over asynchronous transfer mode module, a voice over Internet Protocol for cable module, and a voice over Internet Protocol for plain old telephone system module.

6. The system, as set forth in claim 1, wherein the host processor is operable to initialize any number of modules coupled to the connectors.

7. The system, as set forth in claim 1, wherein at least one module comprises a memory storing data associated with the module.

8. The system, as set forth in claim 1, further comprising a data link coupling the host processor and each of the plurality of connectors to enable direct communication between the host processor and the module.

9. The system, as set forth in claim 1, further comprising a communication link coupling host processor and each of the plurality of connectors to enable direct transfer of telecommunication signals between the host processor and the module.

10. A modular communication and networking system, comprising:
- a base unit;
- a host processor residing in the base unit and coupled to a communications network;
- a plurality of connectors disposed in the base unit each operable to couple to a module, and each module operable to couple to at least one terminal unit;
- a first high speed switch residing in the base unit having a plurality of ports coupled to the plurality of connectors and further coupled to the host processor, the first high speed switch operable to route IP data between the at least one terminal unit and the communications network;
- a second high speed switch residing in the base unit and coupled to the first high speed switch, and further having a plurality of ports operable to couple to at least one terminal unit, wherein the first and second high speed switches are operable to route IP data between the at least one terminal unit coupled to the at least one module, the at least one terminal unit coupled to the second high speed switch, and the communication network; and
- wherein the plurality of connectors each comprises a peripheral component interconnect connector operable to couple to card edge contacts on a printed circuit board in the at least one module.

11. A modular communication and networking system, comprising:
- a base unit;
- a host processor residing in the base unit and coupled to a communications network;
- a plurality of connectors disposed in the base unit each operable to couple to a module, and each module operable to couple to at least one terminal unit;
- a first high speed switch residing in the base unit having a plurality of ports coupled to the plurality of connectors and further coupled to the host processor, the first high speed switch operable to route IP data between the at least one terminal unit and the communications network;
- a second high speed switch residing in the base unit and coupled to the first high speed switch, and further having a plurality of ports operable to couple to at least one terminal unit, wherein the first and second high speed switches are operable to route IP data between the at least one terminal unit coupled to the at least one module, the at least one terminal unit coupled to the second high speed switch, and the communication network; and
- wherein the base unit comprises:
  - first, second and third walls forming a chamber in which the plurality of connectors are disposed; and
  - a hinged fourth wall enclosing the chamber and protecting any module coupled to the connectors.

12. The system, as set forth in claim 11, wherein the third wall comprises a transparent portion providing a view of any module coupled to the plurality of connectors.

13. A modular gateway operable to couple a plurality of terminal units and a communications network, comprising:
- a base unit operable to accept and couple to a plurality of modules each having a predetermined functionality, and each module operable to couple to at least one terminal unit;
- a host processor residing in the base unit and coupled to the communications network;
- a first high speed switch residing in the base unit having a plurality of ports coupled to the plurality of connectors and further coupled to the host processor, the first high speed switch operable to route IP voice and data signals between the terminal units and the communications network;
- a second high speed switch residing in the base unit and coupled to the first high speed switch, and further having a plurality of ports operable to couple to at least one terminal unit, wherein the first and second high speed switches are operable to route IP data between the at least one terminal unit coupled to the modules, the at least one terminal unit coupled to the second high speed switch, and the communication network; and
- wherein the base unit further comprising a plurality of connectors each having a peripheral component interconnect connector operable to couple to card edge contacts on a printed circuit board in each module.

* * * * *